United States Patent
Liu et al.

(10) Patent No.: US 10,828,933 B2
(45) Date of Patent: Nov. 10, 2020

(54) COMBINED WHEEL

(71) Applicant: CITIC DICASTAL CO., LTD., Hebei (CN)

(72) Inventors: Weidong Liu, Hebei (CN); Bowen Xue, Hebei (CN); Chuanqun Li, Hebei (CN); Zhuo Zhou, Hebei (CN); Jiandong Guo, Hebei (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 267 days.

(21) Appl. No.: 16/024,375

(22) Filed: Jun. 29, 2018

(65) Prior Publication Data
US 2019/0193460 A1 Jun. 27, 2019

(30) Foreign Application Priority Data
Dec. 25, 2017 (CN) .......................... 2017 1 1417435

(51) Int. Cl.
*B60B 3/04* (2006.01)
*F16D 65/12* (2006.01)
*B60B 21/02* (2006.01)
*B60B 3/10* (2006.01)
*B60B 23/10* (2006.01)
*F16D 65/02* (2006.01)
*F16D 65/847* (2006.01)

(52) U.S. Cl.
CPC .............. *B60B 3/045* (2013.01); *B60B 3/044* (2013.01); *B60B 21/021* (2013.01); *F16D 65/12* (2013.01); *B60B 3/10* (2013.01); *B60B 23/10* (2013.01); *B60B 2900/111* (2013.01); *B60B 2900/513* (2013.01); *F16D 65/847* (2013.01); *F16D 2065/138* (2013.01); *F16D 2065/1372* (2013.01)

(58) Field of Classification Search
CPC ......... B60B 3/041; B60B 3/042; B60B 3/044; B60B 3/045; B60B 3/047; B60B 21/021; B60B 21/08; F16D 65/12
USPC ..................... 301/64.202, 6.1, 6.7
See application file for complete search history.

(56) References Cited

U.S. PATENT DOCUMENTS 5,096,264 A * 3/1992 Hayashi ................... B60B 3/06
                                                          301/64.202
8,646,850 B2 * 2/2014 Moore .................. B60B 21/062
                                                          188/71.1

(Continued)

FOREIGN PATENT DOCUMENTS

WO    WO-2018109682 A1 *  6/2018  ............... B60B 3/10

*Primary Examiner* — Kip T Kotter
(74) *Attorney, Agent, or Firm* — IPro, PLLC; Qian Gu

(57) ABSTRACT

A combined wheel includes spokes, steel bushings, a rim, a brake pad, pins and a backing ring. The spokes are placed in respective empty slots between adjacent connecting blocks, and clamping grooves therein are matched with the connecting blocks. The pins are installed into holes of the spokes and the connecting blocks. A left end face of a backing ring is matched with the back of the spokes. A plurality of screws connect the backing ring, the connecting blocks and the spokes and are fitted into the steel bushings. The brake pad is fixed to two pluralities of bosses by a second plurality of screws. In use of the combined wheel, both radial force and axial force generated in the running of the wheel can be counteracted on the spokes. The annular brake pad is installed on the inner wall of the rim, thereby increasing the brake radius.

1 Claim, 3 Drawing Sheets

(56) References Cited

U.S. PATENT DOCUMENTS

2015/0273934 A1* 10/2015 Huidekoper ............ B60B 3/045
                                                        301/11.1
2016/0311252 A1* 10/2016 Werner ................... B60B 3/041
2018/0037056 A1*  2/2018 Jungbecker ............... B60B 3/04

* cited by examiner

US 10,828,933 B2

COMBINED WHEEL

CROSS REFERENCE TO RELATED APPLICATION

This application claims priority to Chinese Patent Application No. 201711417435.6, entitled COMBINED WHEEL and filed on Dec. 25, 2017, which is incorporated herein by reference in its entirety and for all purposes.

FIELD OF THE INVENTION

The present invention relates to a wheel, specifically to a combined wheel.

BACKGROUND OF THE INVENTION

At present, the automotive industry is advancing towards green development, and it also puts forward a higher requirement for the wheels as important moving parts. In order to achieve the purpose of weight reduction, rims and spokes need to be made of different materials. The rims and spokes made of different materials are often connected by bolting. The hub motor used in an electric vehicle requires a large enough space in a wheel backcavity. The conventional structure of a brake disc severely restricts the structure of hub motor. Therefore, a new brake form is the premise of sufficient design of the hub motor.

SUMMARY OF THE INVENTION

The aim of the present invention is to provide a combined wheel, wherein the radial force and the axial force generated in the running process of the wheel can be counteracted on spokes; an annular brake pad is installed on the inner wall of the rim, bosses I and bosses II are arranged on the inner wall of the rim, with empty slots being reserved therebetween in the axial direction of the rim, so that the heat generated during braking can be quickly dissipated.

In order to fulfill the above aim, the technical solution of the present invention is: a combined wheel, comprising spokes, steel bushings, screws I, a rim, screws II, a brake pad, pins and a backing ring, wherein the steel bushings are installed in step grooves at the top of the spokes; 10-50 connecting blocks are uniformly distributed in the circumferential direction of the rim and are integrated with the rim, with the arc length formed by an empty slot between every two adjacent connecting blocks being greater than that of the connecting block itself; clamping grooves on the spokes are matched with the connecting blocks, respectively; the pins are matched with the spokes and the connecting blocks; the left end face of the backing ring is matched with the backs of the spokes; and the screws I connect the backing ring, the connecting blocks and the spokes together and are matched with the steel bushings.

Bosses I and bosses II are both integrated with the rim, the bosses I are arranged to be symmetric about the center of the rim, and bosses II are also arranged to be symmetric about the center of the rim, with an empty slot being reserved between each group of boss I and boss II in the axial direction of the rim; the bosses I and the bosses II are uniformly distributed on the inner side of the rim in the circumferential direction of the rim; and the brake pad is annular and is fixed to both the bosses I and the bosses II by the screws II.

During operation, the spokes are placed in the empty slots between the adjacent connecting blocks, and then are rotated so that the clamping grooves in the spokes are matched with the connecting blocks respectively; the pins are installed into holes of the spokes and the connecting blocks from the backs of the spokes; the left end face of the backing ring is matched with the backs of the spokes; the screws I connect the backing ring, the connecting blocks and the spokes together and are fitted into the steel bushings; and the brake pad is fixed to both the bosses I and the bosses II on the rim by the screws II.

In use of the combined wheel of the present invention, both the radial force and the axial force generated in the running of the wheel can be counteracted on spokes, and the shear force generated during running can be prevented from being transmitted to connecting screws for the rim and the spokes, thereby reducing both the quantity of screws employed and the size of the screws. The annular brake pad is mounted on the inner wall of the rim, thereby effectively increasing the brake radius and reducing the clamping force required during braking. Bosses I and bosses II are arranged on the inner wall of the rim, with empty slots reserved therebetween in the left-right direction of the structure, so that the heat generated during braking can be quickly dissipated. Meanwhile, the combined wheel has the characteristics of high structural strength, light weight, large space in rim back cavity and the like.

Figure 1:
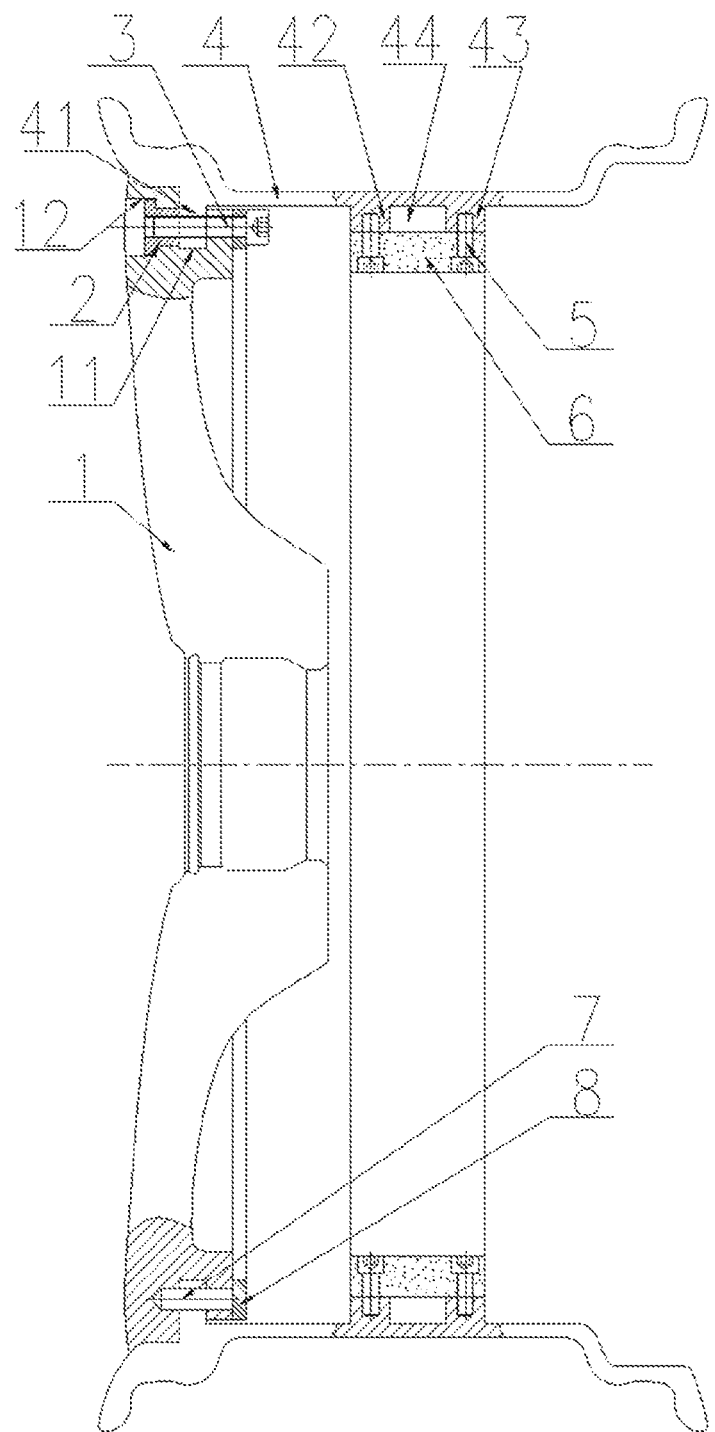
FIG. 1 is a side elevational view of a combined wheel of the present invention.

In the drawings, 1-spoke, 2-steel bushing, 3-screw I, 4-rim, 5-screw II, 6-brake pad, 7-pin, 8-backing ring, 11-clamping groove, 12-step groove, 41-connecting block, 42-boss I, 43-boss II, 44-empty slot II, 45-empty slot I.

DETAILED DESCRIPTION OF THE PREFERRED EMBODIMENTS

The details and working conditions of the specific device according to the present invention will be described below in combination with the drawings.

Figure 2:
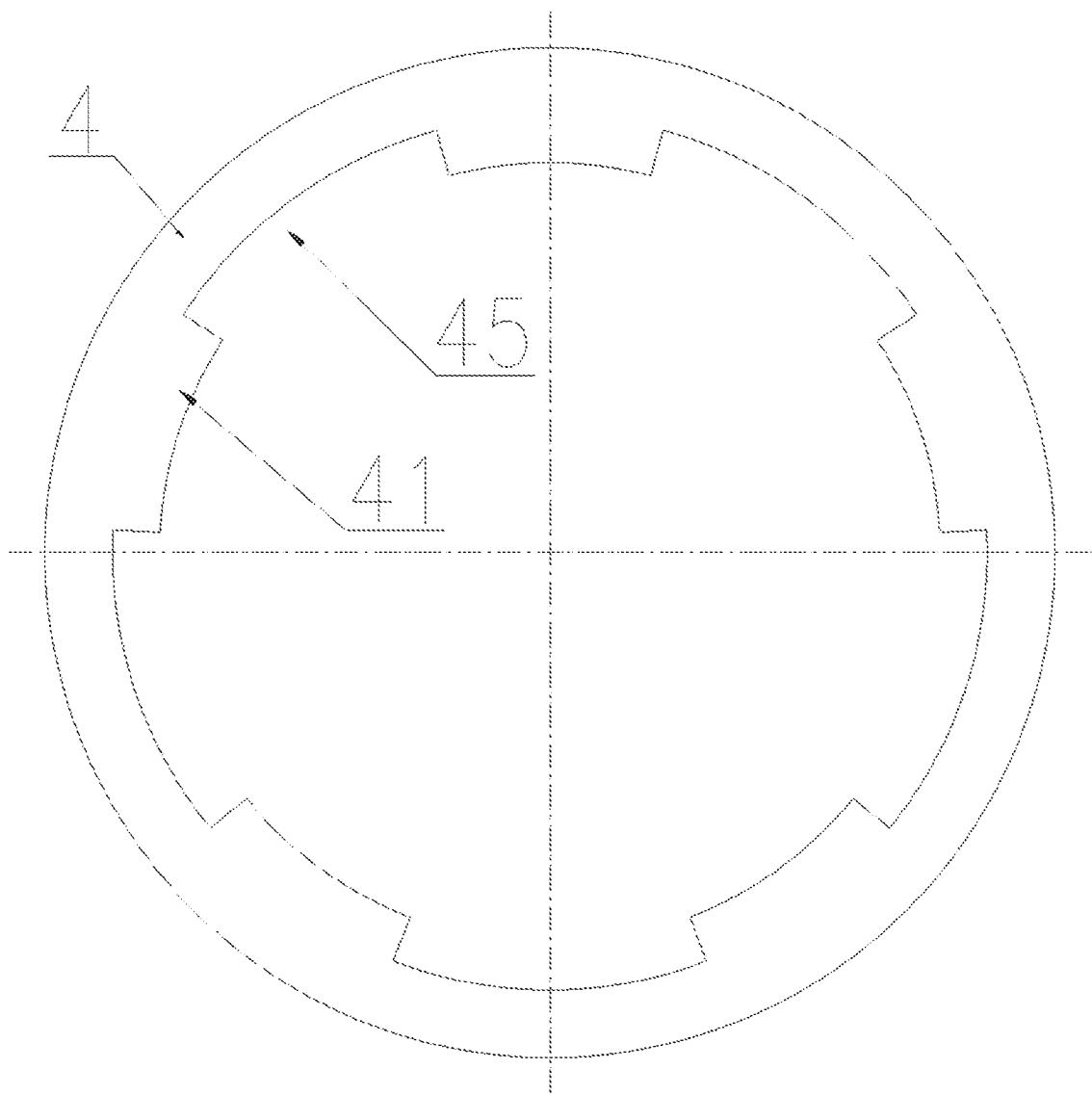
FIG. 2 is a front plan view of a rim of the combined wheel of the present invention.
Figure 3:
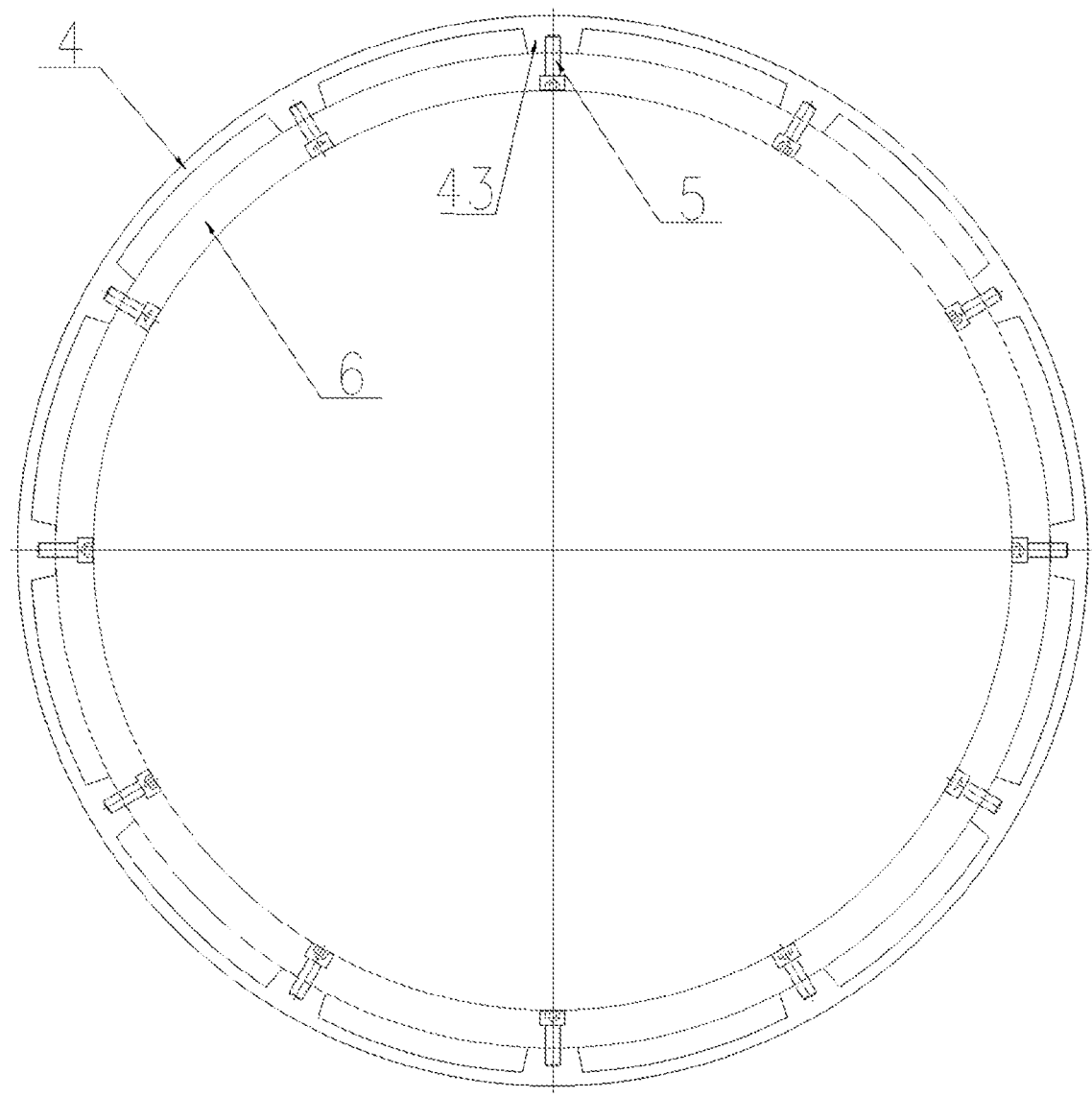
FIG. 3 is a rear plan view of the rim of the combined wheel of the present invention.

As shown in FIGS. 1-3, the device comprises spokes 1, steel bushings 2, screws I 3, a rim 4, screws II 5, a brake pad 6, pins 7, a backing ring 8 and the like, wherein the steel bushings 2 are installed in step grooves 12 at the top of the spokes 1; 10-50 connecting blocks 41 are uniformly distributed in the circumferential direction of the rim 4 and are integrated with the rim 4; the arc length formed by an empty slot I 45 between every two adjacent connecting blocks 41 is greater than that of the connecting block 41 itself; clamping grooves 11 in the spokes 1 are matched with the connecting blocks 41; the pins 7 are matched with the spokes 1 and the connecting blocks 41; the left end face of the backing ring 8 is matched with the backs of the spokes 1; and the screws I 3 connect the backing ring 8, the connecting blocks 41 and the spokes 1 together and are matched with the steel bushings 2.

Bosses I 42 and bosses II 43 are both integrated with the rim 4, bosses I 42 are arranged to be symmetric about the center of the rim, and bosses II 43 are also arranged to be symmetric about the center of the rim. Specifically, two groups of bosses I 42 and bosses II 43 as shown in FIG. 1 are arranged to be symmetric about the centerline of the rim, with an empty slot II 44 being reserved between each group of boss I 42 and boss II 43 in the left-right direction as shown in FIG. 1 (an axial direction of the rim); the bosses I 42 and the bosses II 43 are uniformly distributed on the inner side of the rim 4 in the circumferential direction of the rim 4; and the brake pad 6 is annular, and is fixed to both the bosses I 42 and the bosses II 43 by the screws II 5.

During operation, the spokes 1 are placed in the empty slots I 45 between the adjacent connecting blocks 41, and then are rotated so that the clamping grooves 11 in the spokes 1 are matched with the connecting blocks 41 respectively; the pins 7 are installed into holes of the spokes 1 and the connecting blocks 41 from the backs of the spokes 1; the left end face of the backing ring 8 is matched with the backs of the spokes 1; the screws I 3 connect the backing ring 8, the connecting blocks 41 and the spokes 1 together and are fitted into the steel bushings 2; and the brake pad 6 is fixed to both the bosses I 42 and the bosses II 43 on the rim by the screws II 5.

The invention claimed is:

1. A combined wheel, comprising spokes, steel bushings, first screws, a rim, second screws, a brake pad, pins and a backing ring, wherein the steel bushings are installed in step grooves of the spokes; connecting blocks are uniformly distributed in a circumferential direction of the rim and are integrated with the rim, with an arc length formed by a first empty slot between every two adjacent connecting blocks being greater than a length of the connecting block; clamping grooves in the spokes are matched with the connecting blocks respectively; the pins are matched with the spokes and the connecting blocks; a left end face of the backing ring is matched with backs of the spokes; the first screws connect the backing ring, the connecting blocks and the spokes together and are matched with the steel bushings; and first bosses and second bosses are both integrated with the rim, the first bosses are arranged to be symmetric about a center of the rim, and the second bosses are also arranged to be symmetric about the center of the rim, with a second empty slot being reserved between each group of the first boss and the second boss in an axial direction of the rim; the first bosses and the second bosses are each uniformly distributed on an inner side of the rim in the circumferential direction of the rim; and the brake pad is annular and is fixed to both the first bosses and the second bosses by the second screws.

\* \* \* \* \*